OR  3,663,083

United States
Friedman et al.

[15] 3,663,083
[45] May 16, 1972

[54] LIGHT DIRECTING DEVICE HAVING AN ELLIPTICAL REFLECTING FACE

[72] Inventors: Jerrold Friedman; Robert Walker, both of Stamford, Conn.

[73] Assignee: Columbia Broadcasting Systems, Inc.

[22] Filed: Sept. 15, 1970

[21] Appl. No.: 72,308

[52] U.S. Cl. ............................350/96 R, 250/227, 350/7, 350/201, 353/98
[51] Int. Cl. .................................G02b 5/14, G02b 17/00
[58] Field of Search ................350/96 R, 6, 7, 22, 200, 201; 250/227; 353/98

[56] References Cited

UNITED STATES PATENTS

| | | | |
|---|---|---|---|
| 3,179,898 | 4/1965 | Meltzer | 350/201 X |
| 3,437,804 | 4/1969 | Schaefer et al. | 350/96 X |
| 3,473,860 | 10/1969 | Beckmann et al. | 350/7 |

*Primary Examiner*—John K. Corbin
*Attorney*—Spencer E. Olson and Martin M. Novack

[57] ABSTRACT

A light directing device adapted for use in a film scanning apparatus in which a beam is scanned about a rotation axis and converges to a focus at a circular arc at which a film is positioned. The device comprises a transparent body having an entrance face, a reflecting face, and an exit face. The entrance face has a circular shape and is adapted to be positioned behind the film so as to receive the light beam transmitted through the film. The reflecting face has an elliptical shape and is angularly oriented with respect to the entrance face such that it reflects the light beam substantially perpendicularly and toward the exit face. The light beam leaving the exit face is confined to a small enough area to be received by a single photodetector.

5 Claims, 5 Drawing Figures

PATENTED MAY 16 1972

INVENTORS.
JERROLD FRIEDMAN
ROBERT WALKER

BY

M. Novack

ATTORNEY 3,663,083

LIGHT DIRECTING DEVICE HAVING AN ELLIPTICAL REFLECTING FACE

BACKGROUND OF THE INVENTION

The invention herein described was made in the course of or under a contract or subcontract thereunder, with the Department of the Air Force. This invention relates to a light directing device and, more particularly, to such a device as utilized in an apparatus which scans a film with a light beam and measures the light transmitted through the film.

Various systems have been developed which utilize a laser beam for reading or recording data on film. For example, an unmodulated laser beam can be scanned over a film at a precisely controlled rate and the transmitted portion of the beam measured by a photodetector. The varying optical densities of the different areas of the film act to amplitude modulate the laser beam and the photodetector output generates a video signal representative of the film data. The video signal can be transmitted to a remote location and the original film data reproduced using a recorder apparatus. In the recorder, the video signal is used to amplitude modulate a laser beam which is scanned at a precise rate over unexposed film. In this manner, the original film information can be reproduced at the remote location.

The information storage capacity of a system such as that described is dependent upon the size of the light spot (i.e. the focused beam) used to scan the film. Also, the rate of information transfer of the system depends upon scanning speed as well as the light spot size. It is therefore desirable, within practical limits, to scan at the highest possible speeds with the smallest possible light spot. FIG. 1 depicts a system which has been used to achieve relatively fast scanning speeds with a highly focused laser beam. A laser beam 20 is focused by a lens 21 upon a film 22. The focused laser beam is reflected off an optical spinner 23 which acts to scan the beam across the film along a scan line 24. The film is advanced in the direction of the arrow 30 and is thereby scanned line-by-line. The light passing through the film is received by a photodetector 25.

The film 22 should preferably have a substantial width, for example about 5 inches, so that visual information may be represented in two dimensions with adequate resolution. However, the film width gives rise to the problem of the detection of light by the photodetector 25 as is demonstrated with the aid of FIG. 1B. FIG. 1B shows the path of the scanned laser beam as it leaves the spinner and is directed toward and through the film. At any given instant the focused beam consists of a cone of light (such as the cone 40) which is focused at a point along the circular arc 50. The arc 50 is a portion of a circle having its center at the rotation axis of the spinner, designated as point P. The film is positioned coincident the arc 50 and advances in a direction perpendicular to the paper in FIG. 1B. The focused light spot is scanned across the film through a scan angle α, which for relatively wide films may be as much as 35° or greater. After the beam passes through the film it diverges as is seen, for example, by examining the outer rays 41 and 42 of light cone 40. The divergence angle β is typically about 19° corresponding to an f/6 light cone. For proper operation of the system, the photodetector 25 (FIG. 1A) should receive all of the light transmitted through the film. For various reasons it is desirable to use a single photodetector, and the limited physical size of a photodetector gives rise to the problem of directing the transmitted beam thereto.

Refractive or reflective optical means have been utilized, with limited success, to direct and collect the light from a scanned beam. However, the parameters of the described system would virtually eliminate from consideration most types of light directing means. A refractive light director for use in conjunction with a relatively wide scan angle and low f-number are found to be too complex to be practical. Simpler reflective light directors generally run afoul of two important system constraints: Firstly, the amplitude of the beam should not vary as a function of the instantaneous scan angle; that is to say, the light director should not attenuate the beam by different amounts at different scan angles. (Preferably, the light director should not substantially attenuate the beam at all.) Secondly, the precise relationship between the beam position and the photodetector output signal should not be disturbed by the light director. This is particularly important at high scanning speeds where the transit time of the light beam in the light director becomes significant.

Light directors which rely on multiple reflections from converging walls are clearly inadequate for the proposed application as they do not provide a flat amplitude response and they introduce unwanted temporal dispersion. The single-reflection light pipe 60 of FIG. 1C has also been found lacking in some respects. The scanned beam is reflected from the curved reflective surfaces 61 and 62, toward the photodetector 65, as is illustrated for the beam at positions A, B and C. When the beam is near the center of the scan (e.g. position D), it is received directly by the photodetector. The fact that the beam is sometimes reflected and sometimes not reflected is undesirable in and of itself. A most serious problem, however, arises as the beam is in the position C where it is reflected toward the photodetector at a very acute angle. An instant later the beam is incident on the photodetector without reflection at almost the perpendicular. This transition, which occurs at the near ends of the reflectors 61 and 62, affects the output of the photodetector 65. The result is generally a "signature" in the film reproduced by the system; i.e., an extraneous area of blurring and poor resolution.

Accordingly, it is an object of the present invention to provide a light directing device which eliminates the recognized disadvantages of prior art light directors and which permits signature-free operation of film reading and recording systems of the type referenced.

SUMMARY OF THE INVENTION

The present invention pertains to a light directing device adapted for use in an apparatus in which a film is scanned with a light beam and the light transmitted through the film is measured with a photodetector. In the apparatus, the beam is scanned about a rotation axis and converges to a focus at a circular arc a predetermined radial distance from the axis. The film is positioned coincident the circular arc.

The light directing device of this invention comprises a transparent body having an entrance face, a reflecting face, and an exit face. The entrance face has a substantially circular shape and is adapted to be positioned behind the film and concentric the arc so as to receive the light beam transmitted through the film. The reflecting face has an elliptical shape and is angularly oriented with respect to the entrance face such that it reflects the light beam substantially perpendicularly and toward the exit face. The photodetector of the apparatus is positioned to receive the reflected beam after it passes through the exit face. In a preferred embodiment of the invention the shape of reflecting face corresponds to that of an ellipse having one focal point located on the rotation axis and the other focal point at the photodetector.

Further features and advantages of the invention will become more readily apparent from the following detailed description when taken in conjunction with the accompanying drawings.

DESCRIPTION OF THE PREFERRED EMBODIMENT

Figure 2:
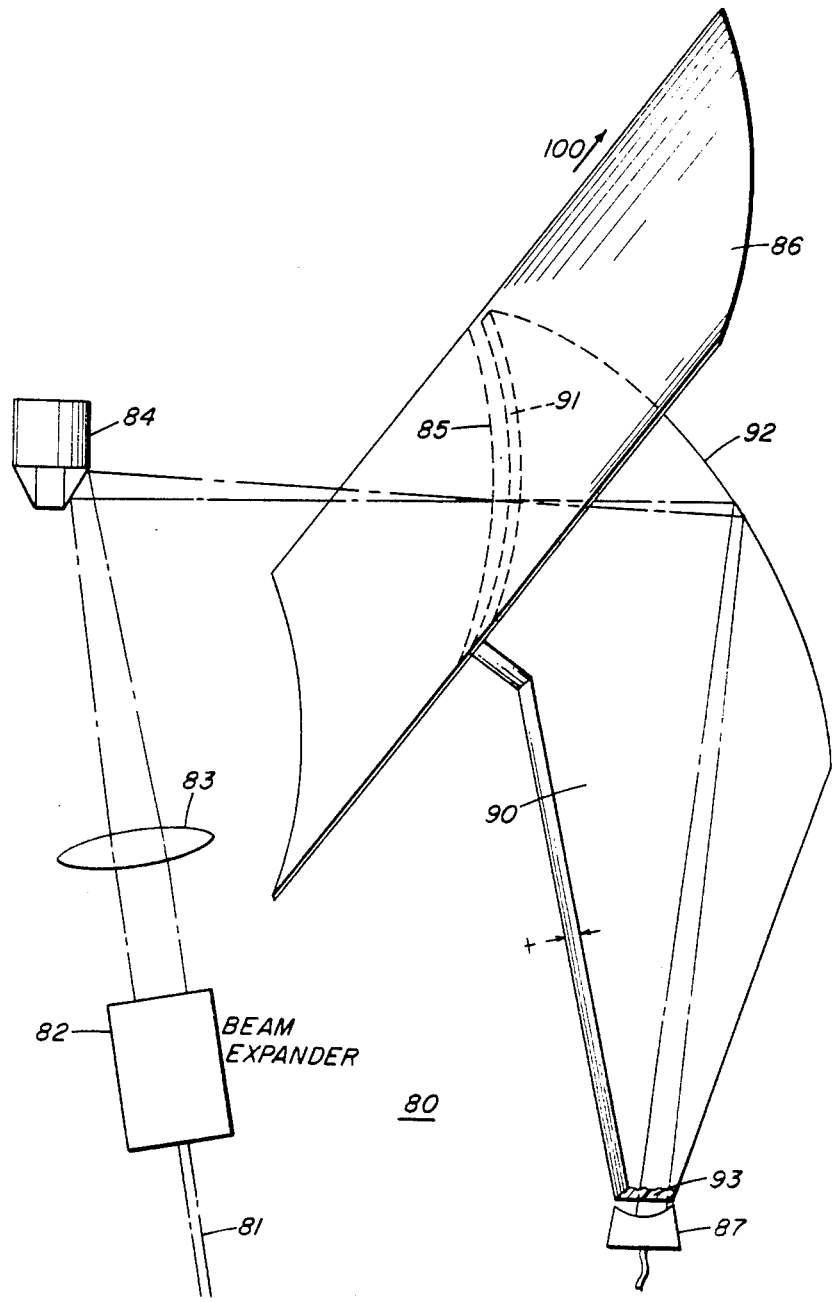
FIG. 2 is schematic representation of a film scanning apparatus which includes the light directing device of the invention.

Referring now to FIG. 2, there is shown a film reading or recording system 80 which includes the light directing device 90 of the present invention. A laser beam 81 is passed through a beam expander 82 and then through a focusing lens 83. The beam is reflected off an optical spinner 84 and is focused at a spot along the arc shown as dashed line 85. The film 86 is positioned coincident the arc 85 so that the spinner 84 scans a focused light spot across a scan line corresponding to the arc 85. The film is advanced in the direction of the arrow 100 and is thereby scanned line-by-line.

After passing through the light directing device 90, the beam is received by a photodetector 87 which is coupled to appropriate processing circuitry (not shown). As is well known, the system 80 can be utilized as either a recording or a reading apparatus. In the recording mode, the input laser beam 81 is amplitude modulated with a video signal and used to selectively expose the film 86. The output of photodetector 87 is used to monitor the amplitude of the laser beam passed through the film. In the reading mode, an unmodulated laser beam 81 is amplitude modulated by the film 86 and the resultant photodetector output is used to generate a video signal representative of the film data.

The light directing device 90 consists of a shaped flat plate of glass or plastic having a thickness which is adequate to contain the beam passing therethrough in its most divergent condition. The device 90 includes an entrance face 91 which has the shape of a circular arc and is adapted to be positioned behind the film 86 and concentric the arc 85. (The common center of arc 85 and face 91 lies on the axis of rotation of the spinner 84.) The reflecting face 92 has an elliptical shape and is angularly oriented with respect to the entrance face so as to reflect an incident light beam substantially perpendicularly and toward the exit face 93.

Figure 3:
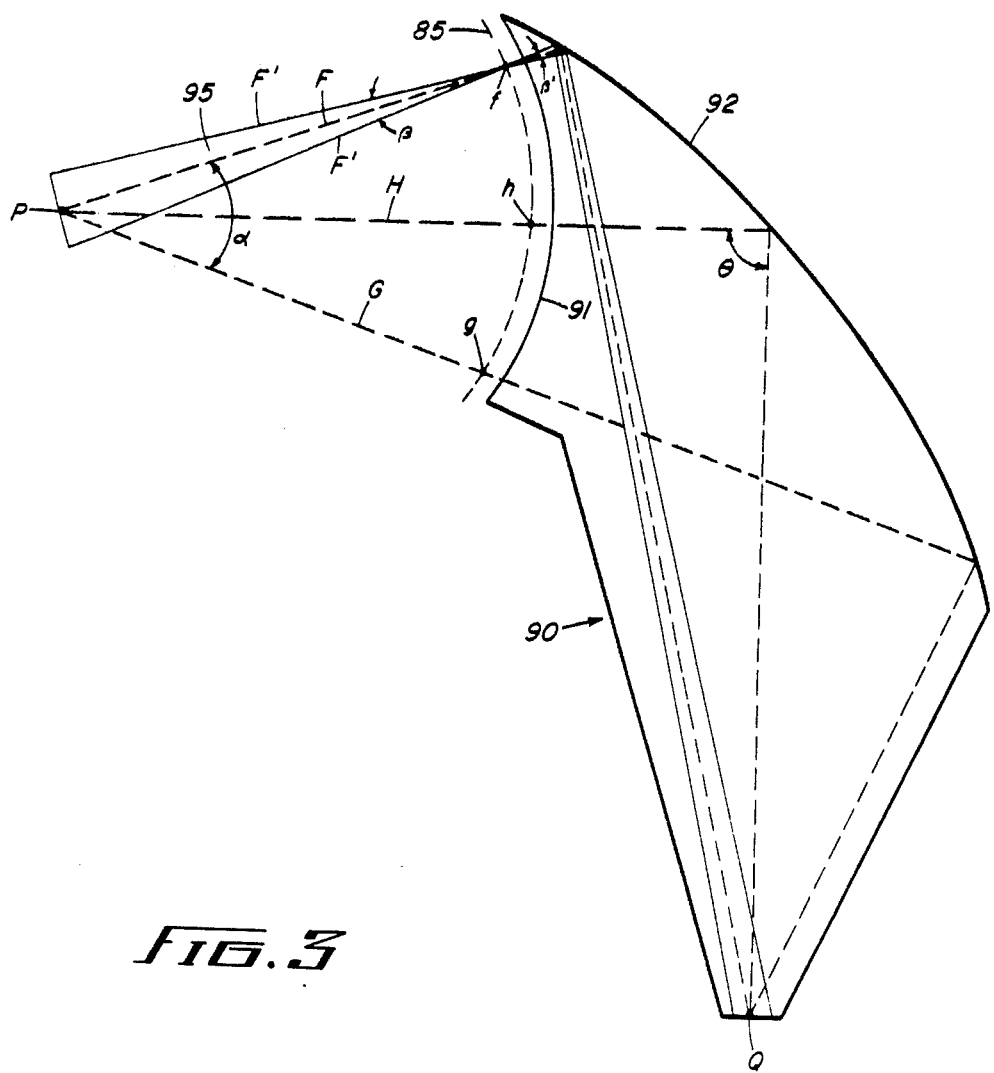
FIG. 3 is an elevational diagram of the light directing device of the invention.

FIG. 3 illustrates the paths of a light beam in the device 90 for various positions during a scan. The dashed lines F, G, and H represent the center ray of the beam as it is respectively positioned at the extremes and at the middle of a scan covering an angle $\beta$. The center rays are effectively projected from the point P which is located on the axis of rotation of the spinner. These rays each enter the device 90 through the entrance face 91 and are reflected from the reflecting face 92 toward a point Q which is located at about the input surface of the photodetector. In the preferred embodiment the photodetector is positioned adjacent the exit face (FIG. 2), and the point Q can be centrally located on the exit face 93, as is shown in FIG. 3. The exit face 93 is a straight edge, and the light beam passes therethrough at about the perpendicular.

Figure 1A:
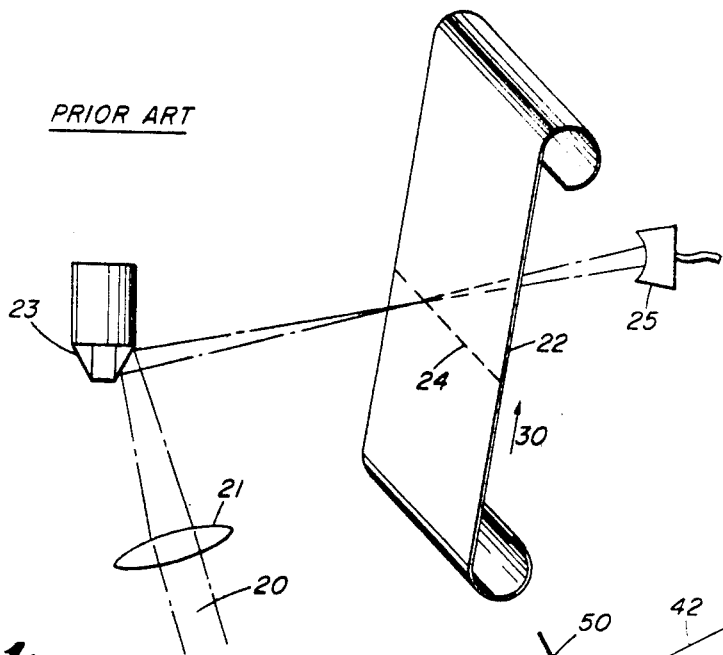
FIGS. 1A, 1B and 1C are schematic diagrams which were utilized to explain the background of the invention.
Figure 1B:
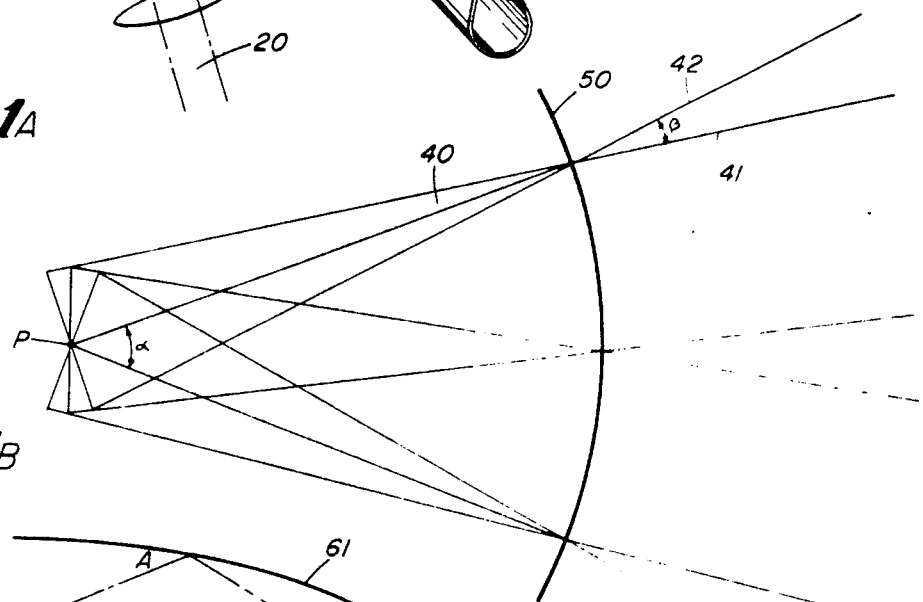
Figure 1C:
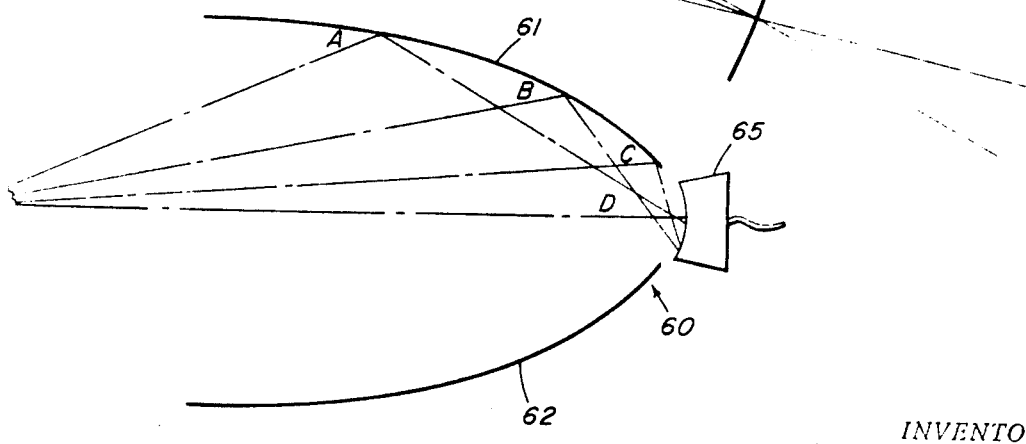

The reflecting face 92 is shaped and positioned as an arc from an ellipse having its focal points at the points P and Q. The chosen ellipse is further defined by fixing the angle $\theta$, at which the center ray H is reflected, at substantially a right angle. In this manner, a relatively wide scan angle $\alpha$, of the order of 30° — 40°, can be handled without the need for a troublesome structure such as that illustrated in FIG. 1C. Also, the light director can be operated on total internal reflection to obviate the need for a lossy reflective coating on the face 92.

In accordance with the known mathematical properties of an ellipse, the light emitted from the point P will be reflected to the collection point Q. Also, and of great importance herein, the path lengths of the light rays are substantially equal and are not dependent upon the instantaneous scan angle. For example, the rays F, G, and H have identical path lengths. It follows that the path lengths of these rays from their point of passage through the film (i.e. points $f$, $g$, and $h$) to the collection point Q are equal. The temporal coherence of the beam is therefore not substantially disturbed by light director 90.

The previous paragraphs have referred primarily to the path of the center ray of the beam during a scan. It should be understood, though, that the beam consists of a cone of light, such as the cone 95 which has outer rays designated F. These rays effectively originate a small finite distance from the point P and, as is seen in FIG. 3, are not reflected exactly to point Q, but rather to within a small distance of point Q. However, this divergence is well within acceptable limits for normal photodetector size. The circular shape of the entrance face acts as a lens in the scanning plane and helpfully reduces the divergence of the beam inside the light director 90. Thus, in FIG. 3 the divergence angle $\beta'$ is less than the convergence angle $\beta$. Also, it should be noted that the incident beam enters the face 91 at the same angle regardless of the instantaneous scan position. This insures that spurious amplitude modulation is not introduced by reason of the varying transmission characteristics associated with varying angles of incidence.

A functioning model of the disclosed light directing device was utilized in a scanning system to collect the light from an F/6 cone, rotating through a 36° arc at a 7 ½ inch radius. The light directing device was made of clear Plexiglass and had a transmission efficiency of above 90 percent. The device exhibited an output amplitude variation (for an unmodulated input beam) of less than 5 percent.

We claim:

1. In an apparatus for scanning a film with a light beam and measuring the light transmitted through the film with a photodetector, wherein the beam is scanned about a rotation axis and the beam converges to a focus at a circular arc, the film being positioned coincident the arc, a light directing device which comprises:

a transparent body having an entrance face, a reflecting face, and an exit face;

said entrance face having a substantially circular shape and adapted to be positioned behind said film and concentric said arc to receive the light beam transmitted through said film.

said reflecting face being angularly oriented with respect to said entrance face such that it reflects said light beam toward said exit face for passage to said photodetector, the shape of said reflecting face corresponding to that of an ellipse having its focal points located at said rotation axis and at said photodetector.

2. A light directing device in accordance with claim 1 wherein said transparent body is a plate of plastic, and said entrance, reflecting, and exit faces are edges of said plastic plate.

3. A light directing device in accordance with claim 2 wherein said reflecting face is oriented with respect to said entrance face such that a ray of said beam which enters the center of said entrance face is reflected perpendicularly toward said exit face.

4. A light directing device in accordance with claim 3 wherein said transparent body is a plate of plastic, and said entrance, reflecting, and exit faces are edges of said plastic plate.

5. A light directing device in accordance with claim 4 wherein the amount of arc subtended by said entrance face is between 30° and 40°.

* * * * *